(12) United States Patent
Hamilton

(10) Patent No.: US 8,322,580 B1
(45) Date of Patent: Dec. 4, 2012

(54) RETRACTABLE CARGO CARRYING DEVICE

(76) Inventor: Billy Hamilton, Beggs, OK (US)

( * ) Notice: Subject to any disclaimer, the term of this patent is extended or adjusted under 35 U.S.C. 154(b) by 256 days.

(21) Appl. No.: 12/834,204

(22) Filed: Jul. 12, 2010

(51) Int. Cl.
*B60R 9/00* (2006.01)
*B60R 9/055* (2006.01)
*B60P 9/00* (2006.01)

(52) U.S. Cl. ......... 224/310; 224/309; 224/328; 414/462

(58) Field of Classification Search .................. 224/310, 224/309, 328, 917; 414/462
See application file for complete search history.

(56) References Cited

U.S. PATENT DOCUMENTS

| | | | | |
|---|---|---|---|---|
| 3,480,166 A | * | 11/1969 | Abbott | 414/462 |
| 3,531,006 A | | 9/1970 | Farchmin | |
| 3,809,266 A | | 5/1974 | Salerni | |
| 4,165,810 A | | 8/1979 | Young | |
| 4,446,998 A | * | 5/1984 | Taig | 224/329 |
| 4,682,719 A | * | 7/1987 | Ernst et al. | 224/310 |
| 5,346,355 A | * | 9/1994 | Riemer | 414/542 |
| 5,360,150 A | | 11/1994 | Praz | |
| 5,423,650 A | * | 6/1995 | Zerbst et al. | 414/462 |
| 5,535,929 A | * | 7/1996 | Neill | 224/310 |
| 5,884,824 A | | 3/1999 | Spring, Jr. | |
| 6,105,840 A | * | 8/2000 | Trevino et al. | 224/310 |
| 6,158,638 A | * | 12/2000 | Szigeti | 224/310 |
| 6,516,984 B1 | * | 2/2003 | Kmita et al. | 224/310 |
| 6,679,407 B2 | * | 1/2004 | Weeks | 224/310 |
| 6,761,296 B2 | * | 7/2004 | Ford et al. | 224/310 |
| 7,108,162 B2 | * | 9/2006 | Stadler et al. | 224/310 |
| 7,226,266 B2 | | 6/2007 | Henderson et al. | |
| 7,513,730 B2 | | 4/2009 | Goyanko | |
| 2002/0014504 A1 | * | 2/2002 | Hetu | 224/310 |
| 2002/0070254 A1 | * | 6/2002 | Weeks | 224/310 |
| 2004/0028511 A1 | * | 2/2004 | Eaton | 414/462 |
| 2006/0133914 A1 | | 6/2006 | Derks | |
| 2006/0175368 A1 | * | 8/2006 | Fallis et al. | 224/310 |

* cited by examiner

*Primary Examiner* — Justin Larson
*Assistant Examiner* — Lester L Vanterpool
(74) *Attorney, Agent, or Firm* — Molly D. McKay

(57) ABSTRACT

The present invention is a retractable cargo carrying device that can be mounted on the top of a trailer such as a horse trailer. The device is provided underneath with a telescoping rail system that secures to the top of the trailer and to a storage box of the device. This telescoping rail system allows the storage box to be lowered near to the ground so that items can be easily placed in the storage box from the ground. Once the storage box is loaded, it can then be retracted back onto the top of the trailer for transport. The storage box has a pivoting attachment to the telescoping rail system that maintains the storage box in a level position at all times, even when lowering and retracting the box relative to the trailer.

10 Claims, 5 Drawing Sheets

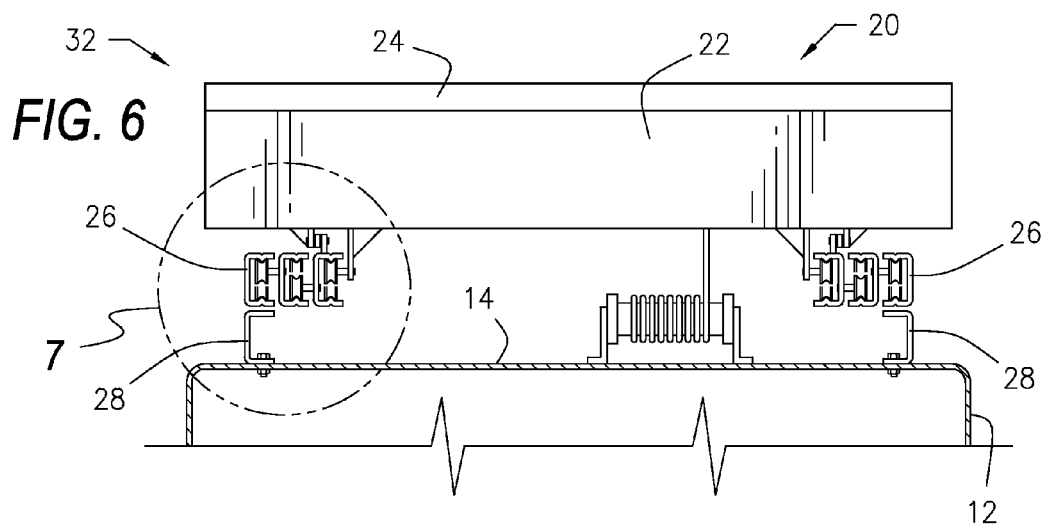
FIG. 6
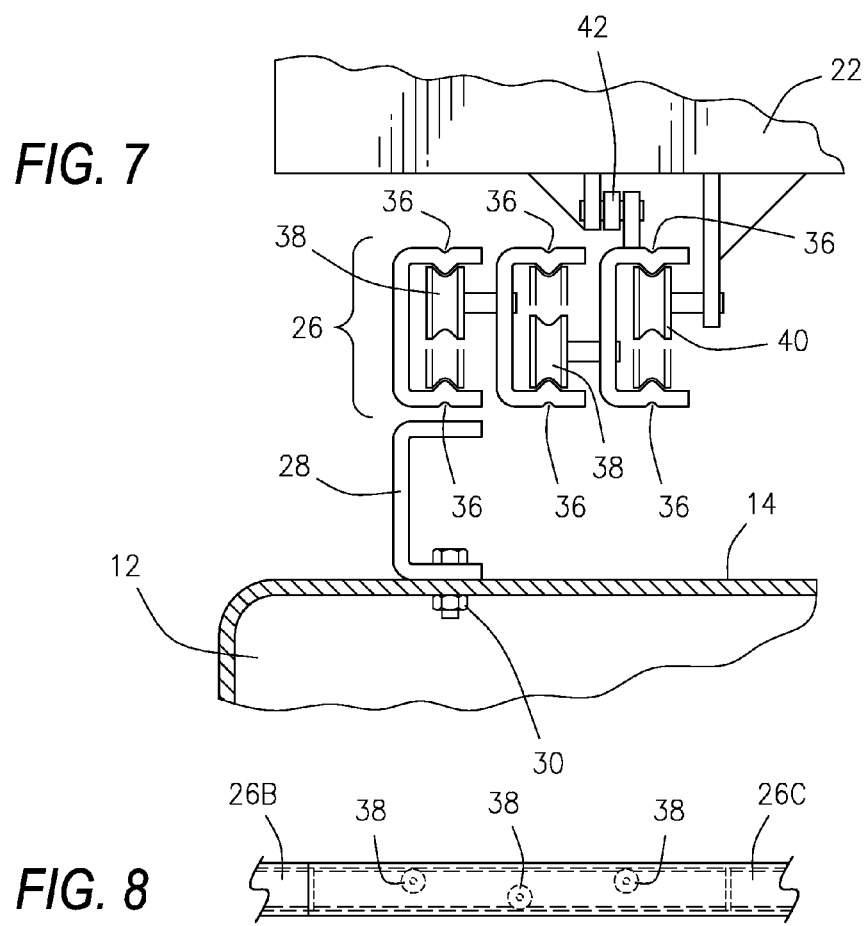
FIG. 7
FIG. 8

RETRACTABLE CARGO CARRYING DEVICE

BACKGROUND OF THE INVENTION

1. Field of the Invention

The present invention is a retractable cargo carrying device that can be mounted on the top of a trailer such as a horse trailer. The device is provided underneath with a telescoping rail system that secures to the top of the trailer and to a storage box of the device. This telescoping rail system allows the storage box to be lowered near to the ground so that items can be easily placed in the storage box from the ground. Once the storage box is loaded, it can then be retracted back onto the top of the trailer for transport. The device maintains the storage box in a level position at all times, even when lowering and retracting the box relative to the trailer.

2. Description of the Related Art

Prior art storage boxes for trailers are generally permanently mounted onto the top of the trailer. Such storage boxes are often used in association with horse trailers as a place to store extra hay, tack, etc. The problem with these prior storage boxes is that to access them, you have to climb up on top of the trailer. This is usually facilitated by a ladder that is attached to the back of the trailer or by use of a free standing ladder that is used in association with the trailer. Climbing on top of a trailer is inconvenient and dangerous. It is particularly difficult when the person is carrying a bale of hay or other heavy object to be stored in the box or retrieving items that were previously stored in the box. Adding to the danger is that the ladder is out in the weather and the steps can become wet and slippery due to precipitation falling on them or due to mud that may be on the person's shoes as they are attempting to climb the ladder.

The present invention addresses this problem by providing a retractable cargo carrying device that can be mounted on the top of a trailer. This invention includes a telescoping rail mechanism that will automatically lower a storage box near to the ground so that it can be easily accessed from the ground to store or remove items from the box. Once access to the box is no longer needed, the box can then be automatically retracted back to the top of the trailer for storage and for transport. To insure that objects placed in the box remain in the box and do not become disturbed as the box is lowered and raised, the device maintains the storage box in a level position at all times, even when lowering and retracting the box relative to the trailer.

SUMMARY OF THE INVENTION

The present invention is a retractable cargo carrying device that can be mounted on the top of a trailer such as a horse trailer. The device includes a storage box and underneath the storage box is a telescoping rail system that secures to the top of the trailer and to the storage box.

The storage box has a pivoting attachment to the telescoping rail system that allows the telescoping rail system to be raised at an angle relative to the top of the trailer while still maintaining the storage box in a level position at all times. This pivoting action is facilitated by pivotal attachment of the lower base rails to the upper telescoping rails and by linear actuators that, in conjunction with pivot members securing the storage box to the upper telescoping rails, allow the storage box to be raised and maintained at a level orientation as the underlying supporting telescoping rails are raised at an angle of about 45 degrees above the top of the trailer.

Once the telescoping rails are at their raised angled position, the telescoping rails extend downward, allowing the storage box to be lowered near to the ground so that items can be easily placed in the storage box from the ground. A winch or other suitable device can be used to control and facilitate the lowering of the storage box on the telescoping rails.

This same winch or other suitable device is also used, once the storage box is loaded, to retract the storage box and the telescoping rails back onto the top of the trailer. Once fully retracted, the telescoping rails are lowered back onto the top of the trailer, and simultaneously, the storage box is lowered back down to maintain it in a horizontal position. Once the telescoping rails and storage box are lowered back to the top of the trailer, they are in their original position approximately parallel with the top of the trailer. This is the storage or transport position.

BRIEF DESCRIPTION OF THE DRAWINGS

FIG. 6 is a rear view of the retractable cargo carrying device and trailer taken along line 6-6 of FIG. 2 showing the upper retractable rails and the lower stationary base rail.

FIG. 7 is an enlarged view of the area contained within circle 7 of FIG. 6 showing the structure of the upper and lower rails and their attachment to the storage box and the trailer.

FIG. 8 is an enlarged view of the area contained within circle 8 of FIG. 5 of the retractable rails showing the overlapping telescoping rails.

DETAILED DESCRIPTION OF THE PREFERRED EMBODIMENT

Figure 1:
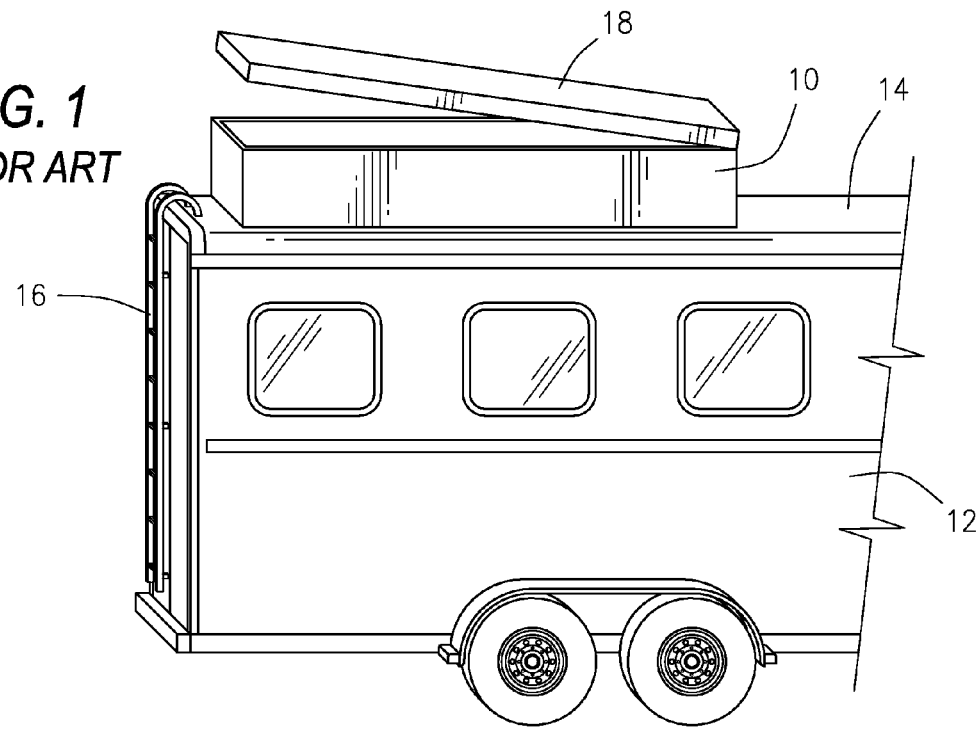
FIG. 1 is typical prior art arrangement of a storage box mounted on the top of a trailer and accessible via a ladder mounted on the back of the trailer.

Referring now to the drawings and initially to FIG. 1, there is illustrated a typical prior art installation of a storage box 10 on top of a trailer 12 such as a horse trailer. This prior art storage box 10 is permanently mounted to the top 14 of the trailer 12 and the prior art storage box 10 can only be accessed by climbing a ladder 16 and then opening the lid 18 of the prior art storage box 10. This is inconvenient since items must be carried to the top 14 of the trailer 12 in order to place them in the prior art storage box 10.

Figure 2:
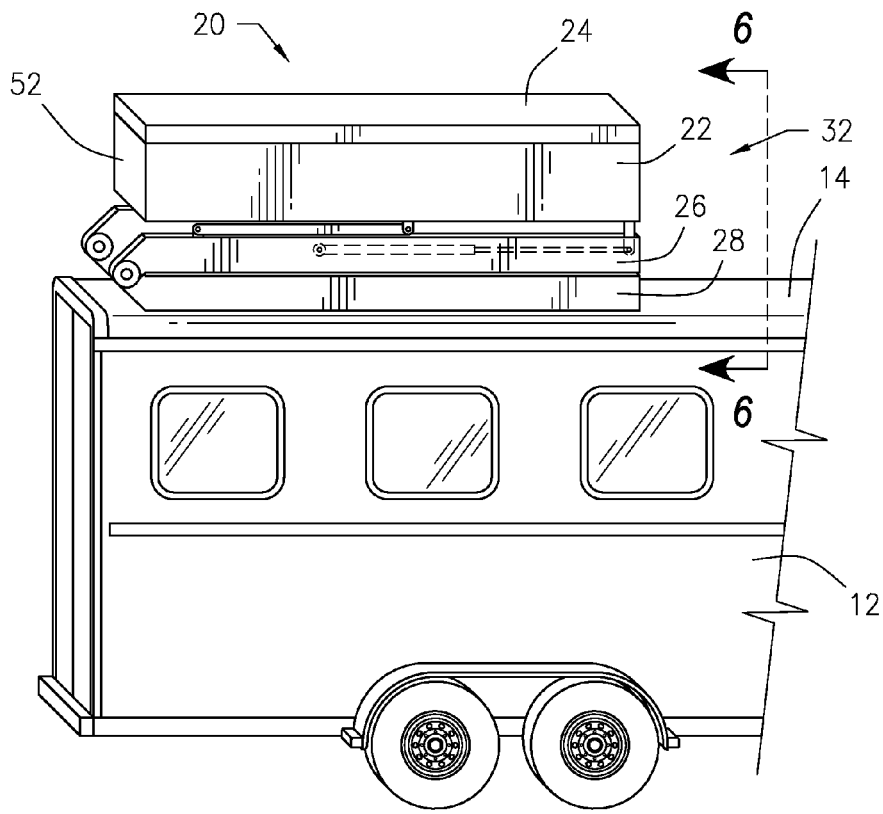
FIG. 2 is the same trailer as illustrated in FIG. 1 with a retractable cargo carrying device of the present invention mounted on top of the trailer.

Referring now to FIG. 2, there is illustrated the present invention, a retractable cargo carrying device 20. This device 20 can be mounted on the top 14 of a trailer 12. The device 20 includes a storage box 22 that is very similar to the prior art storage box 10 and includes a lid 24 for accessing the interior storage are of the storage box 22. Underneath the storage box 22 is an upper telescoping rail system 26 comprised of several telescoping rails 26A, 26B, 26C, etc. and a pair of lower base rails 28. The base rails secure to the top 14 of the trailer 12 by screws, bolts or other suitable fasteners 30. One of the upper telescoping rails 26A on each side of the device 20, preferably the outside telescoping rails 26A, pivotally attaches to its associated the base rail 28 so that the telescoping rail system 26 can be moved from a lowered position 32 where the telescoping rails system 26 is approximately parallel with the base rails 28 to a raised position 34 where the telescoping rail system 26 is raised at and angle of approximately 45 degree angle relative to the base rails 28 and the top 14 of the trailer 12.

As shown in FIGS. 6 and 7, each telescoping rail 26A, 26B, 26C, etc. of the telescoping rail system 26 is provided internally with V-shaped tracks 36 on which rollers 38 travel as the telescoping rails 26A, 26B, 26C, etc. are extended and retracted. The rollers 38 allow the telescoping rails 26A, 26B, 26C, etc. to extend and retract easily, retain the telescoping rails 26A, 26B, 26C, etc. in proper orientation relative to each other, and hold the telescoping rails 26A, 26B, 26C, etc. together by prevent them from detaching from each other. As illustrated in FIG. 8, the telescoping rails 26A, 26B, 26C, etc. are also provided with stop means (not specifically illustrated) that preventing each telescoping rail 26A, 26B, 26C, etc. from extending beyond a limited range relative to its adjacent telescoping rails 26A, 26B, 26C, etc. and thereby insuring that there is adequate overlap of the telescoping rails 26A, 26B, 26C, etc. to support the weight of the storage box 22 and its contents.

The storage box 22 is attached to one of the telescoping rails 26C on each side of the device 20, preferably the inside telescoping rails 26C, by means of additional rollers 40 that secure to the storage box 22 and are movably captured within the inside telescoping rails 26C.

Figure 3:
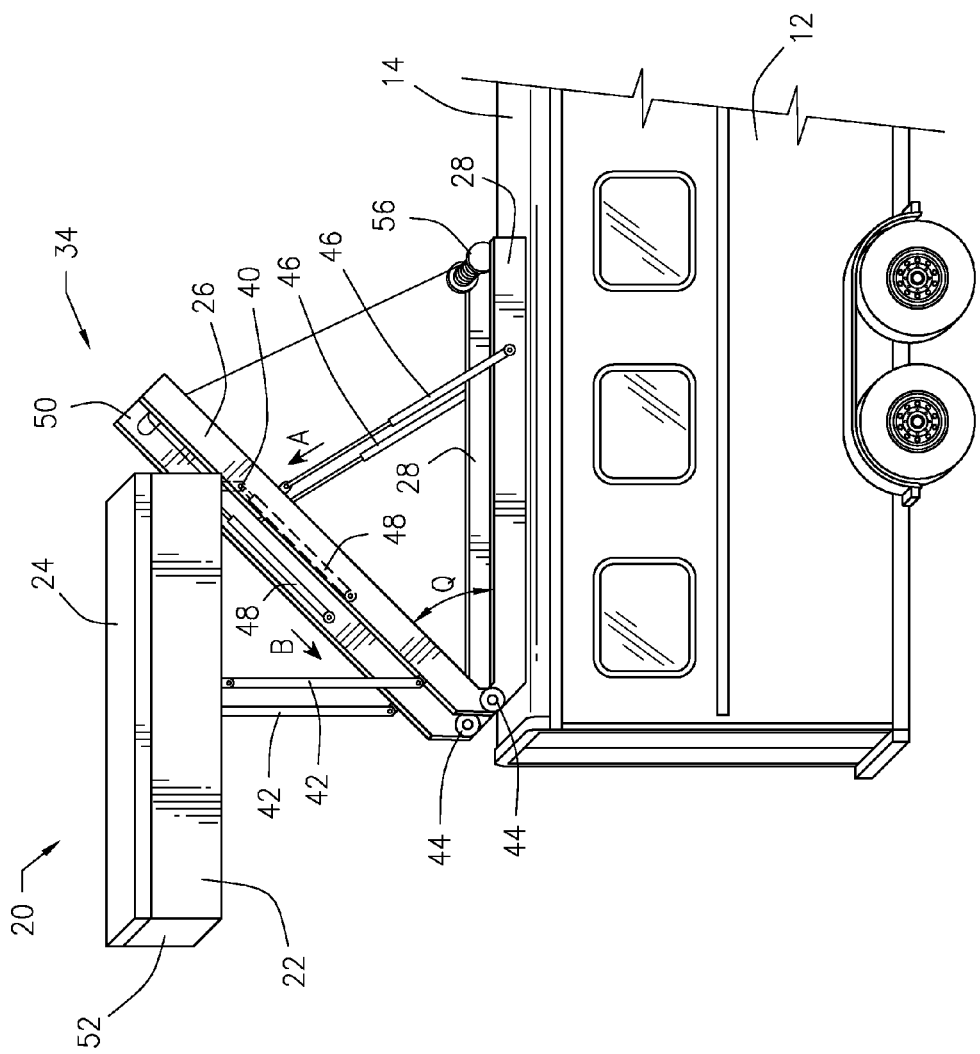
FIG. 3 is the retractable cargo carrying device of FIG. 2 shown with linear actuators simultaneously raising the telescoping rails and the storage box so that the storage box is maintained in a level orientation.

Referring to FIG. 3, the storage box 22 has a pivoting attachment 42 to the telescoping rails system 26 that allows the telescoping rail system 26 to be raised at an angle Q relative to the base rails 28 and relative to the top 14 of the trailer 12 while still maintaining the storage box 22 in a level position at all times. This pivoting action is facilitated by second pivotal attachment 44 of the lower base rails 28 to the upper telescoping rail system 26 and by linear actuators 46 and 48 that, in conjunction with pivoting attachment 42 securing the storage box 22 to the upper telescoping rail system 26, allow the storage box 22 to be raised and maintained at a level orientation as the underlying supporting telescoping rail system 26 are raised at an angle of about 45 degrees above the top 14 of the trailer 12.

As FIG. 3 illustrates, the first set of linear actuators 46 raise the front end 50 of the telescoping rail system 26 by pushing upward in the direction of Arrow A. Simultaneously, the second set of linear actuators 48 raise the rear end 52 of the storage box 22 by pulling on additional rollers 40 in the direction of Arrow B, thus causing the storage box 22 to move rearward, and raising the rear end 52 of the storage box 22 on pivot attachments 42 above the telescoping rail system 26.

Figure 4:
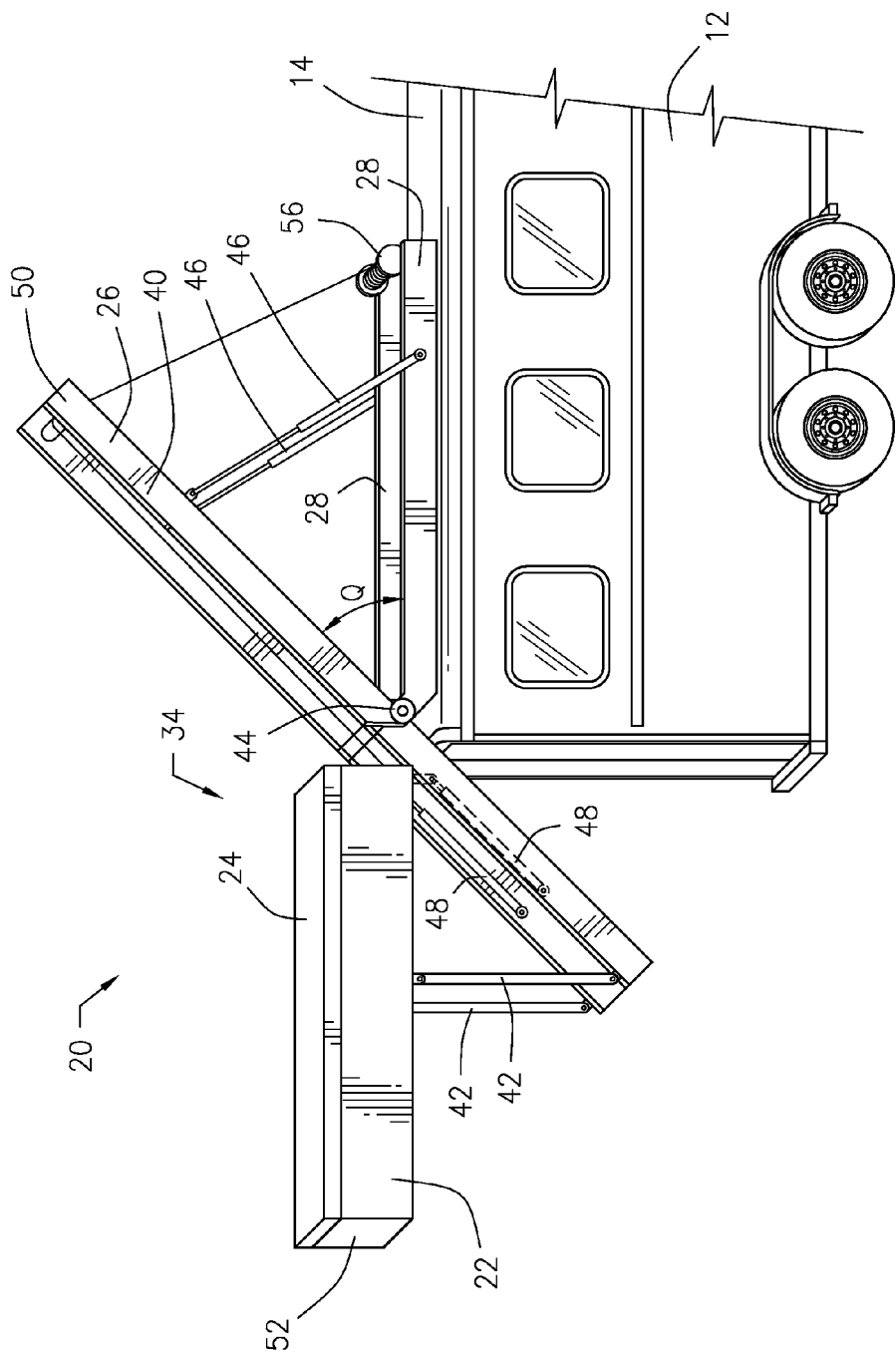
FIG. 4 is the retractable cargo carrying device of FIG. 3 shown as the telescoping rails are extending and storage box is being lowered.
Figure 5:
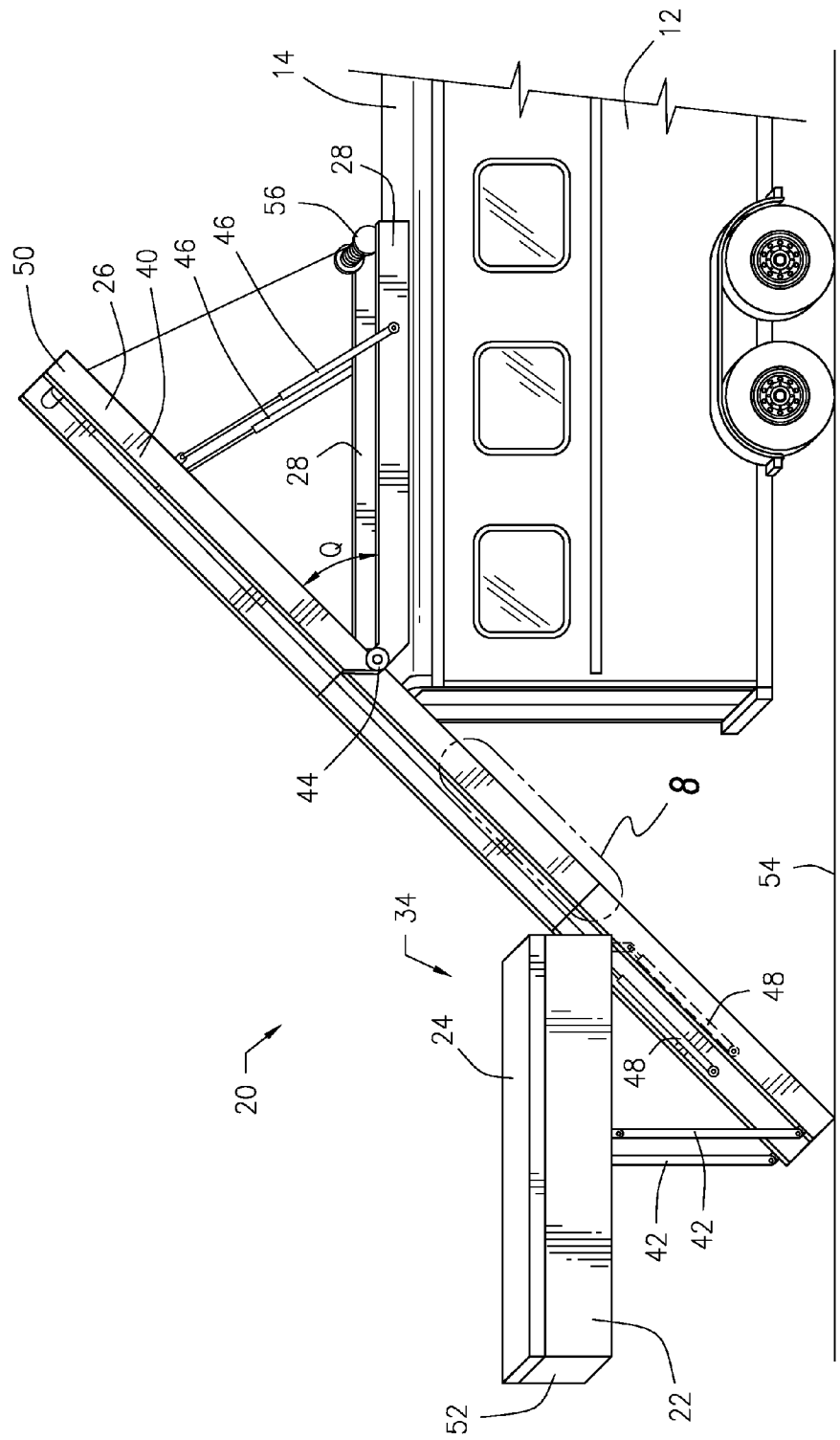
FIG. 5 is the retractable cargo carrying device shown in its lowered position relative to the trailer to which it is attached.

Once the telescoping rail system 26 is at its angled raised position 34, as illustrated in FIG. 3, then, as illustrated in FIG. 4, the telescoping rails 26A, 26B, 26C, etc. extend downward, allowing the storage box 22 to be lowered near to the ground 54, as illustrated in FIG. 5. Once the storage box 22 is lowered near to the ground 54, items (not illustrated) can be easily placed into the storage box 22 or removed from the storage box 22 by a person standing on the ground 54. A winch 56 or other suitable control device can be used to control and facilitate the lowering of the storage box 22 on the telescoping rails 26A, 26B, 26C, etc.

This same winch 56 or other suitable control device is also used to retract the storage box 22 and the telescoping rails 26A, 26B, 26C, etc. back onto the top 14 of the trailer 12. Once fully retracted, the telescoping rail system 26 is lowered back parallel with the top 14 of the trailer 12 by reversing the previous direction of movement of the first set of linear actuators 46, and simultaneously, the storage box 22 is lowered back down to maintain it in a horizontal position by reversing the previous direction of movement of the second set of linear actuators 48, thereby revering the previously described process for raising the telescoping rail system 26. Once the telescoping rail system 26 and storage box 22 are lowered back onto the top 14 of the trailer 12, they are approximately parallel with the top 14 of the trailer 12 and are in their original storage or transport position 32.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A retractable cargo carrying device comprising:
    an openable storage box pivotally attached to a telescoping rail system, said telescoping rail system pivotally attached to at least one base rail for attachment to the top of a trailer such that the telescoping rail system and the storage box pivot simultaneously to always maintain the storage box parallel with the base rail as the telescoping rail system raises at an angle above the base rail and as the telescoping rail system lowers back onto the base rail and as the telescoping rail system extends at an angle to lower the storage box toward the ground and retracts to raise the storage back over the base rail,
    means for reversibly raising the telescoping rail system at an angle above the base rail, and means for simultaneously maintaining the storage box in a parallel orientation relative to the base rail as the telescoping rail system is reversibly raised at an angle,
    wherein said means for simultaneously maintaining the storage box in a parallel orientation relative to the base rail as the telescoping rail system is reversibly raised at an angle further comprises: pivotal attachment of one end of the storage box to said telescoping rail system, means for simultaneously reversibly lifting a second opposite end of the storage box attached to said box.

2. A retractable cargo carrying device according to claim 1 wherein the means for reversibly raising the telescoping rail system at an angle above the base rail further comprises:
    pivotal attachment of one end of the telescoping rail system to one end of the base rail, means for reversibly lifting an opposite second end of said telescoping rail system attached to said telescoping rail system.

3. A retractable cargo carrying device according to claim 2 wherein the means for reversibly lifting said opposite end of said telescoping rail system further comprises:
    at least one linear actuator reversibly extendable and between said telescoping rail system and said base rail.

4. A retractable cargo carrying device according to claim 1 wherein said means for simultaneously reversibly lifting said second end of the storage box further comprises:
    at least one linear actuator reversibly extendable between said storage box and said telescoping rail system.

5. A retractable cargo carrying device according to claim 1 wherein the telescoping rail system further comprises:
    a plurality of individual telescoping rails arranged in telescoping manner and provided with associated rollers which allow the telescoping rails to cooperate to reversibly extend the effective length of the telescoping rail system.

6. A retractable cargo carrying device according to claim 5 further comprising:
   means for reversibly extending the telescoping rail system provided attached to the telescoping rail system.

7. A retractable cargo carrying device according to claim 6 wherein the means for reversibly extending the telescoping rail system further comprises:
   a winch functionally attached to the storage box.

8. A retractable cargo carrying device according to claim 6 wherein the means for reversibly extending the telescoping rail system further comprises:
   at least one linear actuator functionally attached to the storage box.

9. A method for retractably lowering a cargo carrying device attached to the top of a trailer comprising:
   raising a telescoping rail system at a downward oriented angle relative to the top of a trailer to which the telescoping rail system is pivotally secured while simultaneously maintaining at a parallel orientation relative to the top of the trailer an openable storage box which is secured to the telescoping rail system by pivoting a pivotal attachment at one end of the storage box that attaches that end of the storage box to the telescoping rail system and by simultaneously lifting a second opposite end of the storage box, and
   extending the telescoping rail system at the downward oriented angle to lower the storage box off of the top of the trailer so that the storage box can be accessed from the ground.

10. A method for retractably lowering a cargo carrying device attached to the top of a trailer according to claim 9 further comprising:
   retracting the telescoping rail system to raise the storage box back onto the top of the trailer, and
   lowering the telescoping rail system into approximately parallel orientation with the top of the trailer while simultaneously maintaining the storage box in a in a parallel orientation with the to of the trailer by pivoting the pivotal attachment located on one end of the storage box and simultaneously lowering the second end of the storage box.

\* \* \* \* \*